(12) United States Patent
Pinder

(10) Patent No.: US 9,471,330 B2
(45) Date of Patent: Oct. 18, 2016

(54) SYSTEM AND METHOD AND FOR SELECTING BOOT CONFIGURATION USING NEAR FIELD COMMUNICATION

(71) Applicant: MOTOROLA SOLUTIONS, INC., Schaumburg, IL (US)

(72) Inventor: Ellis A. Pinder, Davie, FL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 121 days.

(21) Appl. No.: 14/291,904

(22) Filed: May 30, 2014

(65) Prior Publication Data

US 2015/0347152 A1 Dec. 3, 2015

(51) Int. Cl.
| | |
|---|---|
| G06F 9/00 | (2006.01) |
| G06F 15/177 | (2006.01) |
| H04B 5/00 | (2006.01) |
| G06F 9/44 | (2006.01) |
| G06F 21/57 | (2013.01) |
| G06F 21/35 | (2013.01) |

(52) U.S. Cl.
CPC ........... *G06F 9/4408* (2013.01); *G06F 21/575* (2013.01); *G06F 21/35* (2013.01)

(58) Field of Classification Search
CPC .................................................. G06F 9/4401
USPC ............................................................ 713/1
See application file for complete search history.

(56) References Cited

U.S. PATENT DOCUMENTS

| | | | |
|---|---|---|---|
| 8,024,557 B2 * | 9/2011 | Cumming et al. ................. 713/2 |
| 8,200,954 B2 | 6/2012 | Murawski et al. | |
| 8,331,857 B2 | 12/2012 | Abdulla et al. | |
| 8,483,610 B2 | 7/2013 | Lortz | |
| 8,526,880 B2 | 9/2013 | Foster | |
| 8,565,674 B2 * | 10/2013 | Seol et al. ..................... 455/41.1 |
| 8,826,261 B1 * | 9/2014 | Anand Ag et al. ........... 717/168 |
| 2008/0209199 A1 | 8/2008 | Sadovsky et al. | |
| 2011/0143661 A1 * | 6/2011 | Hartwig et al. ............. 455/41.1 |
| 2012/0322370 A1 * | 12/2012 | Lee .............................. 455/41.1 |
| 2013/0215467 A1 * | 8/2013 | Fein et al. .................... 358/1.15 |
| 2013/0295843 A1 | 11/2013 | Tian et al. | |
| 2014/0122329 A1 * | 5/2014 | Naggar et al. .................. 705/41 |
| 2014/0122901 A1 | 5/2014 | Bilke et al. | |
| 2015/0162956 A1 * | 6/2015 | Bhat .......................... 340/10.51 |

FOREIGN PATENT DOCUMENTS

| | | |
|---|---|---|
| CA | 2 831 158 A1 | 10/2012 |
| WO | 2009/130796 A1 | 10/2009 |
| WO | 2009128032 A1 | 10/2009 |

OTHER PUBLICATIONS

Druml, N. et al.; NIZE—A Near Field Communication Interface Enabling Zero Energy standby for everyday electronic devices—2012 IEEE 8th International Conference on Wireless and Mobile Computing, Networking and Communications (WiMob)—pp. 261-267.

International Search Report and Written Opinion for corresponding International Patent Application No. PCT/US2015/029025, mailed on Jul. 28, 2015.

\* cited by examiner

*Primary Examiner* — Suresh Suryawanshi
(74) *Attorney, Agent, or Firm* — Barbara R. Doutre

(57) ABSTRACT

A system and method to select boot configuration utilizes a processor, a near field communication (NFC) module coupled to the processor, and a near field communication (NFC) tag proximately located to the NFC module. The NFC tag operates as a system configuration tag to configure boot mode of the processor.

10 Claims, 9 Drawing Sheets

SYSTEM AND METHOD AND FOR SELECTING BOOT CONFIGURATION USING NEAR FIELD COMMUNICATION

FIELD OF THE DISCLOSURE

The present disclosure relates generally to processor boot configuration and embedded device boot configuration, and more particularly to selecting one or more boot configurations using a near field communication (NFC) tag.

BACKGROUND

Current microcontrollers (MCUs) often support two or more "boot modes", where the controller starts up using a particular boot process associated with one or more memory buses and/or one or more peripheral buses. For microcontrollers that contain on-chip flash memory, the boot control mechanism is used to select at least one alternate boot method to the flash memory boot. For example, RS-232 or USB boot may be supported by the processor for remote or peripheral booting, whereby a bootloader is downloaded to the microcontroller over the peripheral bus. A common usage of the scenario is "blank flashing", whereby a new micro-controller and/or memory device in a newly manufactured product must be programmed for the first time. The flash memory of the microcontroller is typically blank, so the peripheral boot process is used to affect initial programming.

Some microcontrollers may offer a choice of peripheral boot modes, such as RS-232, USB, I2C, SPI, etc. Additionally, some microcontrollers with external memory interfaces may offer a choice of memory boot modes corresponding to the different memory interfaces. Upon microcontroller reset, the controller knows what memory device to boot from based on the selected boot mode.

It is well-known in the art that one or more input pins to the microcontroller may be dedicated for the purpose of boot control. The microcontroller, upon reset, samples these "boot control pins" for an electrical "signature" and selects the boot mode accordingly. Typically, the boot mode selection is defined by a table that is defined in the microcontroller technical literature and implemented in the ROM code or initialization logic of the microcontroller. In the most trivial example, a single boot selection line may be used, where, for example, a "1" logic level may specify boot from internal flash memory and a "0" logic level may specify boot from USB. Additional boot lines may be defined as needed by the microcontroller developers to create an arbitrarily-large number of combinations, where for "n" lines the combination of choices has a maximum of $2^n$.

This approach becomes problematic for more complex microcontrollers or processors that have a higher number of boot modes and hence a higher number of boot control lines, because additional I/O lines must be used for this purpose which renders certain pin/ball/signal pads unavailable for other purposes. In some instances, the boot control lines may be re-purposed for other uses post-reset, but in many cases this is difficult, not possible, or requires external multiplexing circuitry. Other techniques may be used to reduce pin count such as analog inputs, which may support more than 1 bit per input line. In U.S. Pat. No. 8,200,954, Murawski et al. teaches of a sampling technique used to detect multiple states per boot pin, allowing a larger number of boot modes with a reduced pin count.

It is well-known in the art to design an embedded device containing a microcontroller or processor to allow for the selection of at least two boot modes: a default boot mode used if no explicit boot selection action is taken, and at least one alternate boot mode which is selected by a specific, intentional action. Returning to the previous example, the single boot selection line may be pulled-up to supply (Vcc) to assert a default value of 1 (external memory boot). This is accomplished by the use of a pull-up resistor on the circuit board. The boot control line may be routed to a printed circuit board (PCB) test point, an external connection, or to other dedicated logic where such connectivity may conditionally assert a logic 0 by grounding the line. Under such specific action, the microcontroller, upon reset, would select an alternate boot mode (USB remote booting). In practice this alternate boot mode would be used in the product's factory (the "product" being an embedded device comprising said microcontroller). Some product manufacturers may limit the assertion of this line to select an alternate boot mode to the factory, while other manufacturers may allow assertion after the product is fielded (e.g. for in-field upgrade of software). This is a decision of the product manufacturer. Again, it is noted that a MCU may employ an arbitrarily-sized set of boot control lines.

The existing approaches thus have limitations. As discussed above, boot control lines use I/O lines that may be needed for other purposes. For blank flashing a product, board-level access is required, or alternately a custom interface, custom connector, or custom cable may be needed to assert the necessary signal. Board-level access may further require a custom factory fixture for the printed circuit board. Additionally, the existing approaches may be susceptible to usage by an unauthorized person. Some manufacturers do not desire their products to be alterable in the field, or they want upgrade operation limited to authorized service personnel.

Accordingly, there is a need for a system and method for selecting boot configuration in a more reliable manner that overcomes the aforementioned issues.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
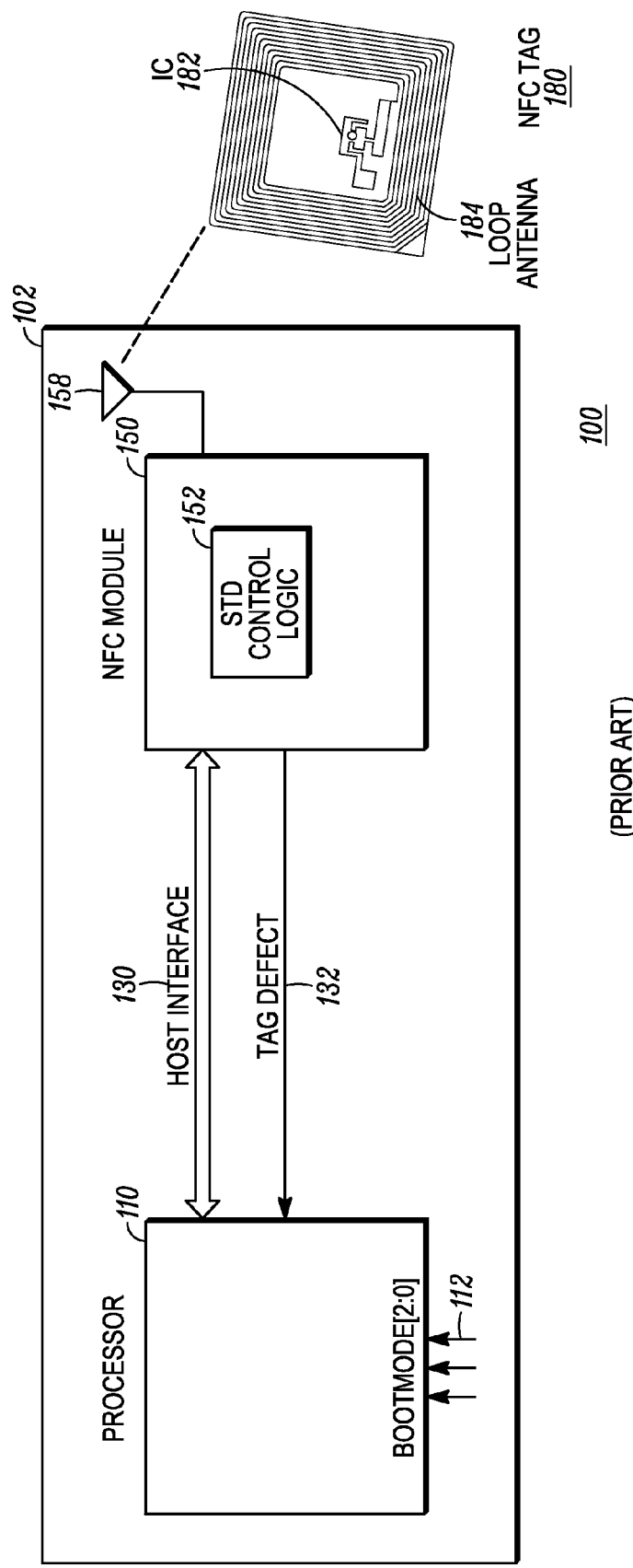
FIG. 1 is a block diagram showing a typical prior art configuration of a microcontroller connected to a near field communication (NFC) module.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. For example, the processor element shown in the various figures may typically operate with any of various memory types not shown in the figures, including RAM, ROM, EEPROM, flash memory, and such memory types may be internal to the processor element or external to the processor element.

DETAILED DESCRIPTION

Briefly, there is provided herein a system and method for an improved approach to boot control using near field communication (NFC) technology. In accordance with the various embodiments, the system comprises a processor, a near field communication (NFC) module coupled to the processor, and a near field communication (NFC) tag proximately located to the NFC module. In accordance with the various embodiments, the NFC tag operates as a system configuration tag to configure boot mode of the processor.

For the purposes of this application, the term "product" is a device comprising an embedded system which may use one or more of the various embodiments. The various embodiments provide for power-up initialization of the product, known as "boot control", to be selected or altered using NFC. Additionally, the some embodiments may also allow the initiation of a reset condition. Examples of products may include but are not limited to radios, cell phones, cameras, printed circuit boards or any programmable/configurable electronic devices.

For the purposes of this application the following additional terms will be defined as follows:
Initiator—Initiates NFC communication and generates an RF field.
Target—an NFC device that responds to Initiator command either using load modulation scheme (RF field generated by Initiator) or using modulation of self-generated RF field
Active Communication Mode—an NFC mode in which both the Initiator and the Target use their own RF field to enable the communication
Passive Communication Mode—an NFC mode where the Initiator is generating the RF field and the Target responds to an Initiator command in a load modulation scheme
Boot Mode—a boot process associated with a memory device, a memory bus, or a peripheral bus
Boot Control Pin—a microcontroller-defined pin used to select a boot mode on a microcontroller
Peripheral Boot—any processor boot mode where code execution begins upon completion of code download from a remote device, typically over a peripheral bus
Memory Boot—any processor boot mode where code execution begins from a non-volatile memory device
Microcontroller—a microcontroller (standard usage of term), but also to include microprocessor, ASIC, programmable logic device, SoC, and the like
NFC Standard Control Logic—logic capable of detecting a regular NFC tag and allowing a separate processor to perform tag operations
NFC Enhanced Control Logic—in addition to capabilities of NFC standard control logic, NFC enhanced control logic is capable of detecting specified data content of a NFC system configuration tag, and further capable of parsing and executing actions described on a valid NFC system configuration tag to conditionally assert a set of system control lines originating from an NFC module.
NFC Tag—(regular device) a contactless, powerless device for pairing with an NFC module
NFC System Configuration Tag—contactless, powerless device for pairing with and transferring configuration data to the NFC module having enhanced control logic
Programming Data—any executable code, configuration data or combination thereof (e.g. firmware image).
Note: passive tags may be substituted with active tags.

FIG. 1 is a block diagram 100 showing a typical prior art configuration of an embedded system 102 and NFC tag 180. The embedded system 102 comprises a microcontroller 110 interfacing to an NFC module 150. The block diagram 100 further shows independent boot input lines 112 as would be used in such a configuration.

The NFC module 150 comprises a typical off-the-shelf NFC module which contains RF circuitry for NFC communication (not shown), a frame controller (not shown), and standard control logic 152 with a host interface 130. The NFC module 150 typically connects to a clock source, a host processor 110, and to a loop antenna 158. The host interface 130 provides data and control paths between the NFC module 150 and the processor 110. The host interface 130 may be proprietary, or it may be any standard interface that is well-known in the art. SPI and I²C are two well-known interface standards that are commonly utilized. Tag detect line 132 provides notification to processor 110 that a NFC tag 180 has been connected. NFC module 150 may operate in a reduced-power mode where it periodically checks for the presence of NFC tag 180. If a tag is detected, NFC module 150 notifies processor 110 using tag detect line 132. Processor 110 may then use host interface 130 to direct NFC module 150 to read NFC tag 180.

As further shown in FIG. 1, NFC tag 180 comprises an NFC tag IC 182 and loop antenna 184. NFC tag 180 contains no power source and is powered by the RF field generated when it is close to NFC Module 150. Those skilled in the art will recognize this as NFC passive communication mode, where load modulation or a similar technique is used for communication. NFC tag 180 is thus a commonly available NFC tag.

FIG. 1 further shows the most common example of boot control which includes a set of boot input lines 112 to a microcontroller or processor 110. Boot control may be used to select a particular boot mode or assert other configuration lines necessary to create, provision, configure, service, and/ or upgrade a product. These boot input lines 112 select the boot source of the processor. A device may contain one or more processors and/or other electronics components or subsystems, and boot control may be applied to any combination thereof. The configuration of prior art block diagram 100 however, is susceptible to the boot control issues discussed in the Background.

In accordance with the various embodiments an improved approach to boot control is provided using near field communication (NFC) technology. Portions of the arrangement of FIG. 1 are represented in the subsequent block diagrams of the various embodiments of the invention to enhance clarity. The various embodiments to be described herein, however, do not require any particular level of integration for the NFC, and the various sub-components of the NFC module may be physically coupled or de-coupled. Additionally, the various sub-components of the NFC module may be integrated with other parts of the embedded system including the processor and external memory.

Figure 2:
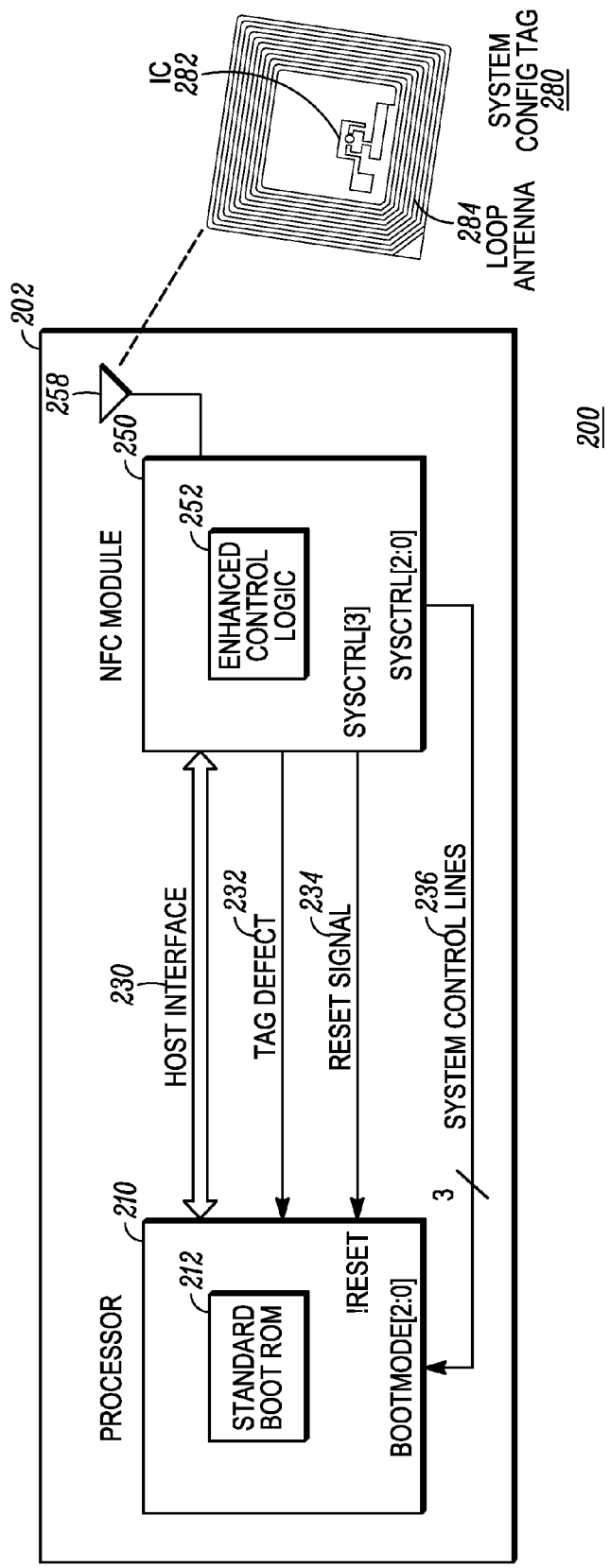
FIG. 2 is a block diagram in which an enhanced NFC module provides boot control line assertion using data from a system configuration tag in accordance with an embodiment.

FIG. 2 is a block diagram of a system 200 for selecting boot control in accordance with an embodiment. System 200 comprises an embedded system 202 comprising a processor 210 and an NFC module 250. The NFC module 250 comprises enhanced control logic 252 to provide boot control line assertion of a processor 210 using data from a system configuration tag 280 in accordance with the embodiment. System 200 comprises a processor 210 connected to NFC module 250 by host interface 230. The NFC module provides the subsystem responsible for NFC operation, including clocks, radio transceivers, control logic, interface logic, micro-code, and antenna. In accordance with the various embodiments, the enhanced control logic 252 is incorporated into NFC module 250. In accordance with the various embodiments, the NFC module 250 advantageously utilizes the enhanced control logic 252 to selectively control boot mode selection and regular NFC operation. A substantial amount of the NFC module may be contained in a single integrated circuit, with antenna circuitry being external to the IC. Tag detect line 232 is also present to signal the detection of system configuration tag 280 to processor 210. In accordance with the various embodiments, the enhanced control logic 252 of NFC module 250 provides the ability to detect specified data content of the system configuration tag 280, process it, and conditionally assert a set of system control lines 236 originating from NFC module 250. System control lines 236 select boot mode of processor 210.

As shown in FIG. 2, reset line 234 and system control lines 236 comprise information bits to control the processor 210. As an example, system 200 shows 4 bits of information being used to control the processor 210. In this example, one system control line is used as reset signal 234 and three system control lines 236 are used to select the boot mode of processor 210. The reset signal is controlled, because it is common for processors such as 210 to only sample and set the bootmode upon processor reset. Use of the reset line is not necessarily required for operation.

The system control lines 236 shall not be limited to 3 lines as shown in the figure, but rather can be any arbitrary number of lines from 1 to "n" and would typically be limited by available pins/balls on the package of NFC module 250. The number of lines and the signals they control on processor 210 are largely a function of the design of processor 210.

System configuration tag 280 comprises NFC tag IC 282 and loop antenna 284. The NFC tag IC 282 contains NFC tag circuitry which further comprises some amount of data memory. As is well-known in the art, the data memory of NFC tag IC 282 may include various types and sizes of memory and may include read-only memory, read/writable memory, one-time programmable memory, or any combination thereof. However, in accordance with the embodiment, the data memory of system configuration tag 280 further contains instructions for enhanced control logic 252 on how to assert reset line 234 and system control lines 236.

Again, in accordance with the embodiment, the data memory of system configuration tag 280, hereafter referred to as "tag data" contains instructions for enhanced control logic 252 on how to assert reset control line 234 and system control lines 236. The tag data may be represented in any format understandable by enhanced control logic 252; however, the data format is preferred to be functionally-descriptive for extensibility, as opposed to a less extensible "lookup table" style approach. For example, NDEF (NFC Data Exchange Format) may be used to contain configuration data to control the system configuration output lines.

In accordance with the embodiment, the enhanced control logic 252, upon detection of system configuration tag 280, then parses the tag data stored in NFC tag IC 282. The enhanced control logic 252 then asserts system configuration lines in accordance with the instructions in the tag data. Various embodiments may be realized with trade-offs made between the control block complexity and the capabilities and operations of the tag data.

In accordance with the embodiment, the enhanced control logic 252 of the NFC module 250 has the ability to detect, read, parse, and take action upon the proximate system configuration tag 280, and these actions are accomplished without the support of processor 210 or host interface 230. In contrast, in the prior art system 100, a normal NFC tag (not a system configuration tag) would be detected by a regular NFC module, its detection would be reported to processor using tag a detect signal or a host interface, and then the processor would send commands to the regular NFC module to read the tag data. Subsequent parsing of the data in the "normal" tag would be done by the processor. The NFC module 250 having enhanced control logic 252 in accordance with the embodiment, however, can autonomously detect and process system configuration tag 280. This advantageously allows system 200 to operate the when a newly-manufactured product is un-programmed.

As an example, consider an NFC module having four system configuration lines. The NFC module is designed to default these lines to logic '1' (a different state may be pre-defined) upon reset. Upon detecting and parsing the system configuration tag 280, the enhanced control block re-configures the system configuration output lines as follows:

SysCtrl [0]: '1'→'0'
SysCtrl [1]: '1'→'1' (no change from default)
SysCtrl [2]: '1'→'1' (no change from default)
SysCtrl [3]: '1'→Hi-Z In this first example, the default value is a logic level high (1), assuming internal pull-up resistors, and the boot signature can override these values to a different value. Other configurations, for example, pull-down configurations are also feasible. In this first example, SysCtrl lines [2:0] are asserted against the processor using the levels shown, and SysCtrl [3] is placed in a high-impedance state. The above lines may all control boot mode selection of the processor, or some or all of the lines may control other aspects of the embedded system necessary in placing the device in the service state corresponding to the system configuration tag 280. To use the system configuration tag 280 in this example, the tag is placed proximate to the NFC module 250 and the device is powered-on or reset.

As a second example, the service configuration tag data may specify additional operations such as "Pulse" which will generate a pulse on a specified output line for a pre-defined or tag-specified duration. The pulse embodiment can be used to facilitate the activation of a reset control of the processor or other system component. In many applications, it is a desirable practice to read the boot configuration upon processor reset de-assertion, and the pulse embodiment of this embodiment can be used to facilitate this reset. The pulse command would initiate a reset while assuring that the appropriate electrical signature is present at the processor. To use the system configuration tag 280 in this example, the tag is placed proximate to the NFC module 250. The device will automatically reset and then enter the specified boot mode.

To illustrate this further, consider the second example again while referring to FIG. 2. Suppose the system configuration tag data 280 is configured as shown below. The configuration would assert "101" to bootmode[2:0] lines of processor 210 upon reset. The reset event itself is initiated by reset signal 234 which is accomplished by connecting SysCtrl[3] to the reset circuitry. This permits entry into boot mode "101" even after the device is already powered up.

Sysconfig [0]: '1'→'1'
Sysconfig [1]: '1'→'0'
Sysconfig [2]: '1'→'1'
Sysconfig [3]: '1'→Pulse low 500 ms While FIG. 2 and the remaining figures depict an NFC tag of the passive, un-powered type, the various embodiments disclosed herein are fully operable by replacing the passive NFC tag with an active, powered tag. An active tag contains it own power source and may generate its own RF field. The various embodiments of the invention are therefore not limited by the type of NFC tag used.

Additionally, for the embodiments of FIG. 2 (and other embodiments to be described in subsequent views), the processor 210 and the near field communication (NFC) module 250, having enhanced control logic 252, may be integrated as a single device operating within a product, or alternatively, the processor 210 and near field communication (NFC) module 250 having enhanced control logic 252 may be separate devices operatively coupled to operate as an initiator within a product. The near field communication (NFC) module 250 operates as an initiator providing NFC communication and generating an RF field.

Figure 3:
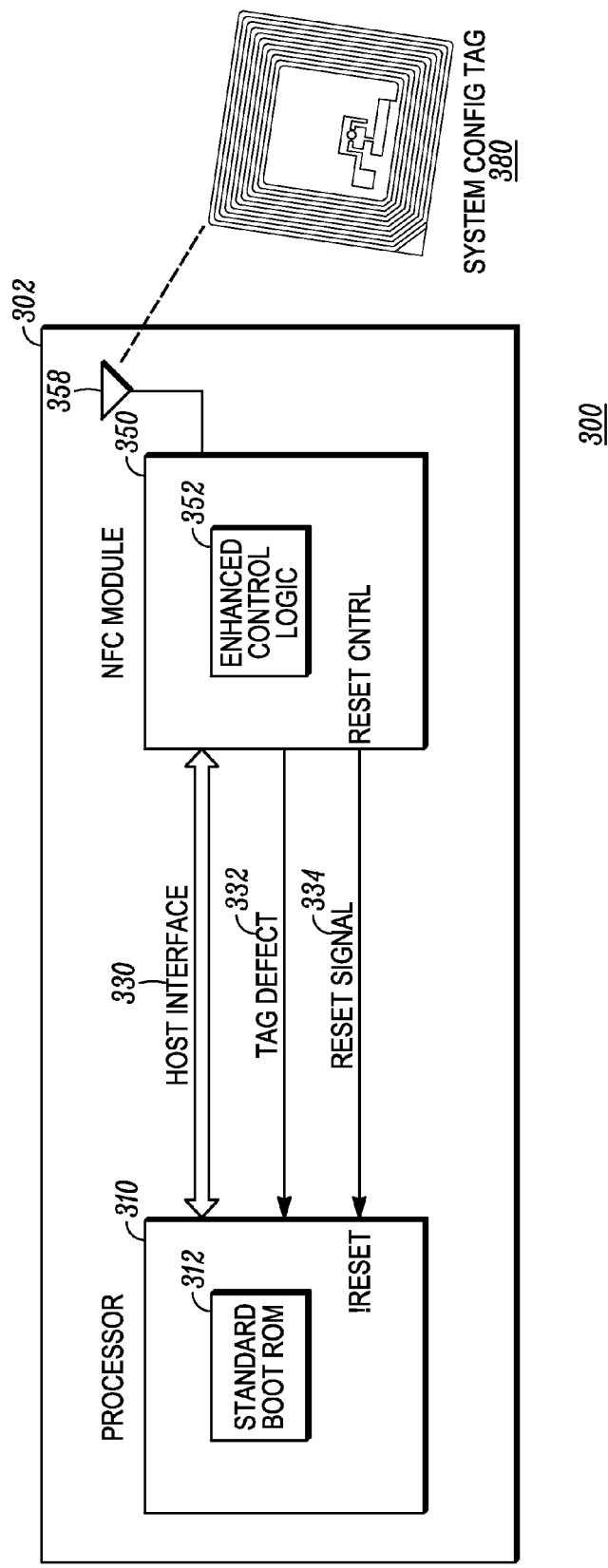
FIG. 3 is a block diagram of an enhanced NFC module providing boot control over a common serial interface using data from a system configuration tag in accordance with another embodiment.

FIG. 3 is a block diagram of a system 300 having an embedded device 302 and a system configuration tag 380 operating in accordance with an embodiment. Embedded device 302 comprises a processor 310 and an NFC module 350 with enhanced control logic 352 providing boot control over a common serial interface using data from a system configuration tag 380 in accordance with this embodiment. The NFC module 350 operates as the initiator device.

In this embodiment, the serial host interface 330 is used for data and control communication between the processor 310 and the NFC module 350. In this embodiment, only a single physical system control line is present as reset signal 334, and additionally logical system control lines (not shown) are conveyed from NFC module 350 to processor 310 over serial host interface 330. Thus, serial host interface 330 continues to be handle control and data functions as shown in Host Interface 230 of FIG. 2, but serial host interface 330 additionally conveys system configuration signals in accordance with the invention. This has the advantage of providing a nearly unlimited number of configuration signatures over a shared host interface without requiring additional physical signal lines on NFC module 350.

It is preferable that serial host interface 330 be a serial interface to further reduce pin count. Serial interfaces such as SPI and I$^2$C are readily applicable and well-suited as host interfaces on various NFC modules, and said interfaces are available on many varieties of microcontrollers. Accordingly, implementing this embodiment in many products designs would not affect the physical communication interface.

In accordance with this embodiment, the processor 310 has the ability to interpret and act upon the system configuration message sent by NFC module 350 over host interface 330. Coordination between the developers of processors 310 and NFC module 350 can support such devices. In particular, to support a blank-flashing case, such support may be in the ROM bootloader 312 of processor 310. Hence, blank flashing a product can now be advantageously performed without board-level access, custom interface, custom connector, or custom cable, or custom factory fixtures. The benefit of this arrangement is reduced complexity and reduced pin count. Additionally, the system and method for selecting boot mode configuration is far less susceptible to unauthorized access.

In another embodiment, a single NFC module 350 may be designed to allow a set of "n" system control lines in addition to serial communication messages. This allows maximum flexibility because serial messages for system configuration lines can be used where supported and/or desired, and alternately, physical system configuration lines may be used where needed. In this embodiment, this can all be accomplished in the design of a single NFC module.

Figure 4:
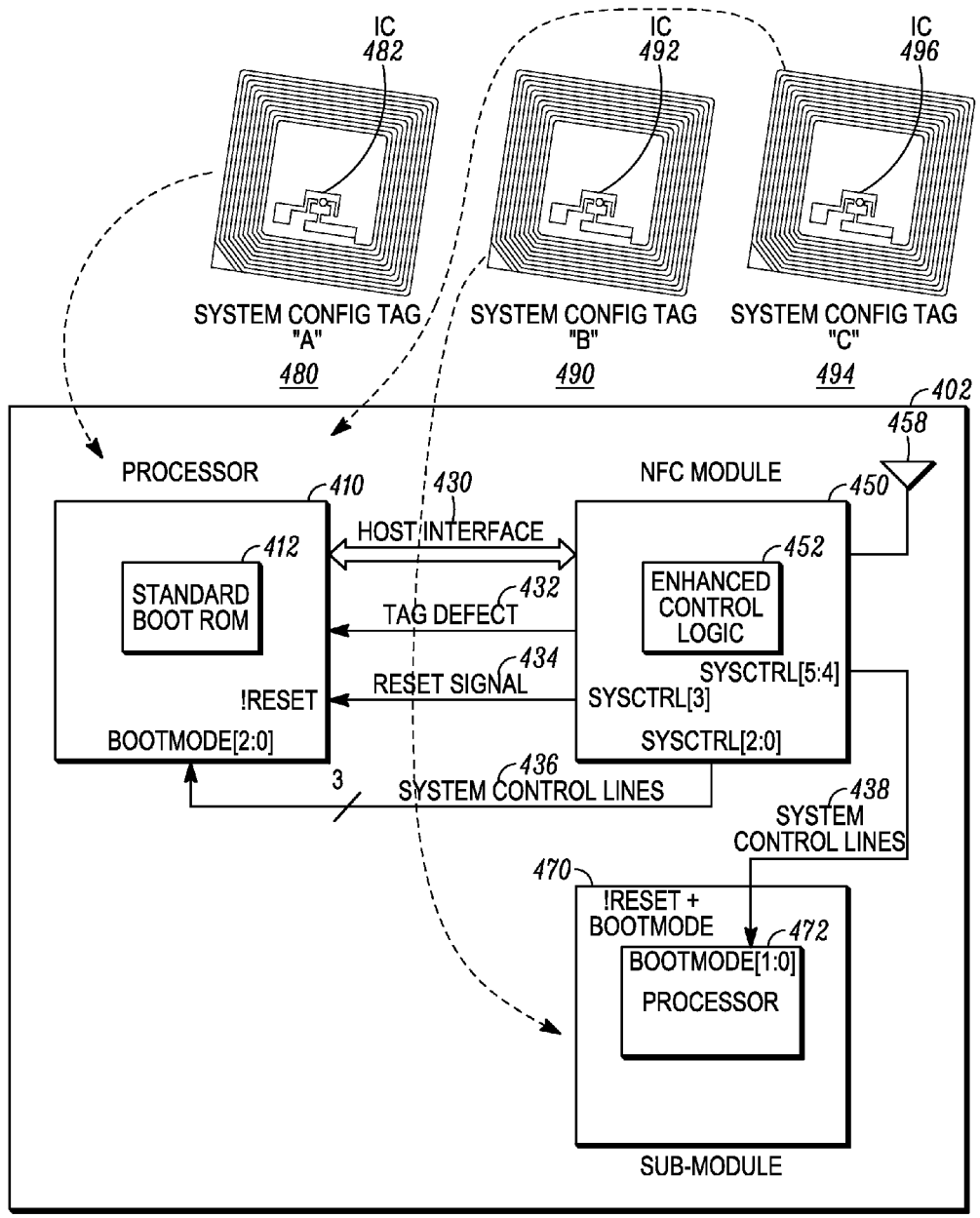
FIG. 4 is a block diagram in which an enhanced NFC module provides boot control line assertion to a plurality or processors and/or sub-modules in accordance with another embodiment.

FIG. 4 is a block diagram of a system 400 comprising an embedded device 404 and a plurality of system configuration tags 480, 490, 494 in accordance with another embodiment. Embedded device 402 comprises an NFC module 450 having enhanced control logic 452 which provides boot control line assertion to a plurality of processors and/or sub-modules in accordance with another embodiment. In this system 400, the embedded device 402 comprises a processor 410, NFC module 450, and sub-module 470. The sub-module 470 further comprises processor 472. In accordance with the embodiments, NFC module 450 can assert system configuration lines against processor 410, sub-module 470, or both. Embedded device 402 may comprise any number of processors, sub-modules, ASICs, to name a few, and NFC Module 450, in accordance with the various embodiments, may provide boot control via system configuration lines.

As mentioned in other embodiments, the processor 410 and near field communication (NFC) module 450 having enhanced control logic 452 may be integrated as a single device operating within a product, or alternatively, the processor 410 and near field communication (NFC) module 450 having enhanced control logic 452 may be may be separate devices operatively coupled within a product. The NFC module 450 operates as the initiator device.

Consider a factory and/or repair scenario where configuration and/or programming of processor 410 and sub-module 470 are accomplished at separate steps. The plurality of system configuration tags may comprises for example, Tag "A" 480, Tag "B" 490. The data in IC 482 of tag "A" 480 includes boot configuration instructions associated with processor 410. Similarly, the data in IC 492 of tag "B" 490 includes boot configuration instructions associated with sub-module 470.

If device 402 is placed in proximity to system configuration tag 480, processor 410 is configured for a boot mode as indicated by the instructions stored on the tag. If embedded device 402 is placed in proximity to system configuration tag 490, sub-module 470 is configured for a bootmode as indicated by the instruction stored on tag 490.

Additional tags may be defined; furthermore, multiple tags for a single processor, module or sub-system are permitted. For example, the system 200 of FIG. 4 may comprise another tag "C" 494 having different boot configuration instructions stored as data in IC 496 associated with the processor 410. Hence, system configuration tag 480 may assert a first set of system configuration signals for processor 410 to select a first boot mode, and system configuration tag "C" 494 may assert a second set of system configuration instructions to select a second boot mode. These boot modes may be in addition to a default boot mode used by processor 410 if no tag is detected by NFC module 450.

The embodiments of system 400 are advantageous to systems having a plurality of processors and/or sub-modules. In yet further embodiments, the NFC module may use any combination of serial messaging and/or physical lines to control the various processors and/or sub-modules.

Figure 5:
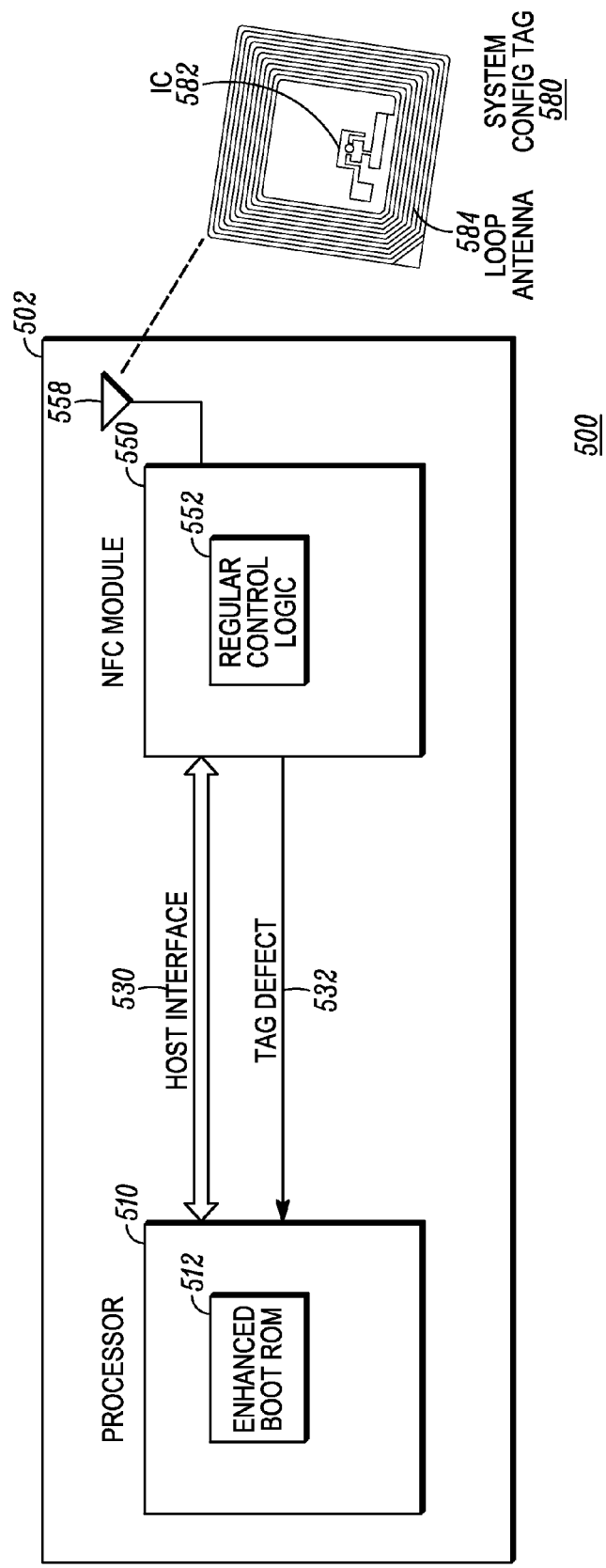
FIG. 5 is a block diagram in which a processor contains ROM firmware capable of operating a normal NFC module in accordance with another embodiment.

FIG. 5 is a block diagram in which a processor contains ROM firmware capable of operating a normal NFC module in accordance with another embodiment. System 500 comprises an embedded device 502 and system configuration tag 580 operating in accordance with another embodiment. Device 502 comprises a processor 510 and an NFC module 550. In this embodiment, NFC module 550 is a common off-the-shelf NFC module; it contains regular control logic 552 instead of enhanced control logic. NFC module 550 communicates with processor 510 using host interface 530 and may also use tag detect line 532 to indicate detection of a tag. However, in this embodiment, processor 510 includes enhanced boot ROM 512 instead of a standard boot ROM.

In accordance with the embodiment, processor 510 having enhanced boot ROM 512 contains code that operates the NFC module 550 to be responsive to RF system configuration tag 580 for boot mode selection, including detecting, parsing, and acting upon the tag information. Since this logic is now handled in the processor, no external GPIO lines are required for boot mode selection. Enhanced boot ROM 512 can allow the processor to output a signal on one or more GPIO lines for the control of other device subsystems, thus allowing a level of system control illustrated in FIG. 4.

Figure 6:
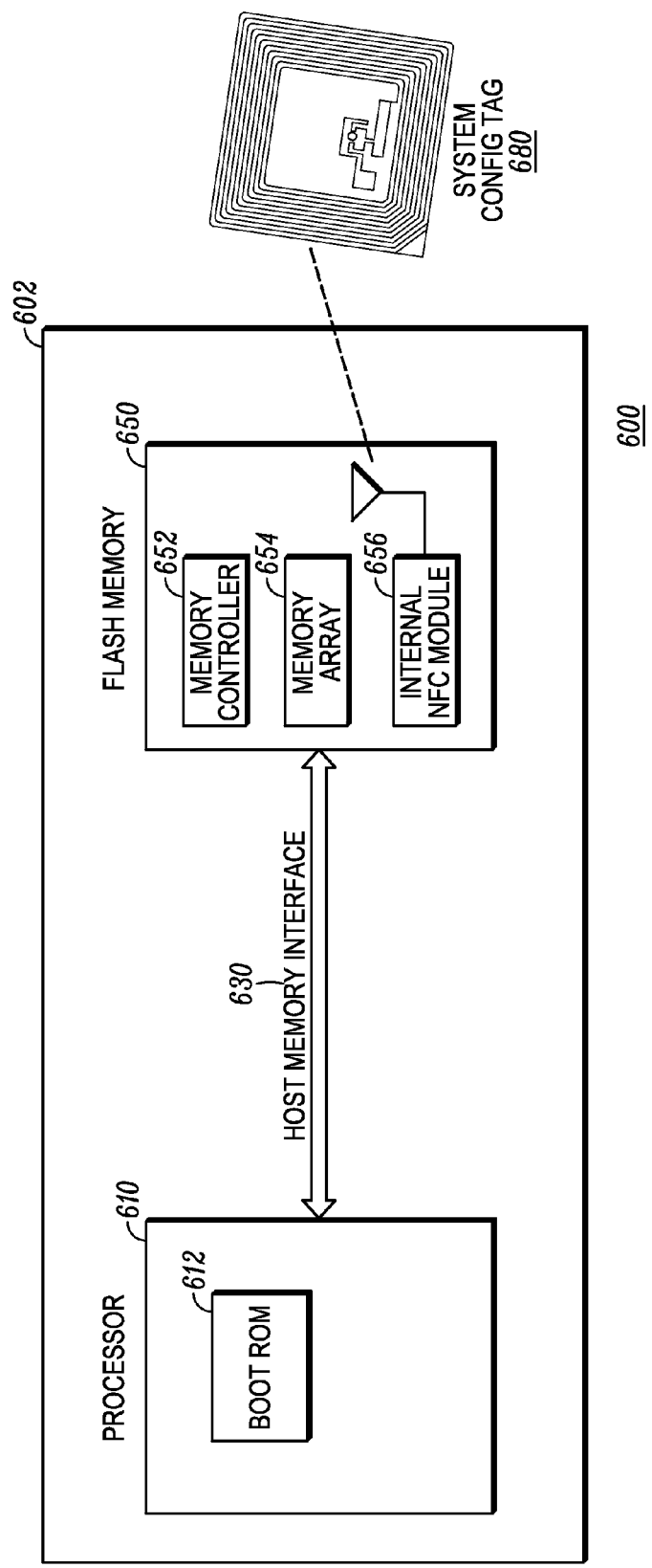
FIG. 6 is a block diagram of a system having a flash memory device containing an NFC module for asserting boot control using data from a system configuration tag in accordance with another embodiment.

FIG. 6 is a block diagram of a system 600 having a flash memory device containing an NFC module which for asserting boot control using data from a system configuration tag in accordance with another embodiment. System 600 comprises a device 602 and system configuration tag 680. Device 602 comprises a processor 610 and a flash memory 650. In accordance with this embodiment, flash memory 650 further comprises flash memory controller 652, at least one memory array 654, and internal NFC module 656. The flash memory device 650 may include an internal NFC loop antenna (shown) or may make use of an external NFC antenna (not shown). In this embodiment, the internal NFC module 656 includes the enhanced control logic presented in the previous embodiments. Thus, flash memory 650 can autonomously detect a system configuration tag 680. As presented in FIG. 6, processor 610 utilizes bootloader ROM support 612 to determine how to communicate with flash memory 650 and check for the assertion of logical boot signatures to select a non-default boot mode. In an alternate embodiment, flash memory 650 may provide system configuration lines (not shown) to directly control boot mode selection of processor 610.

The flash memory 650 may utilize the existing host memory interface 630 for communication with processor 610. In an alternate embodiment, flash memory 650 can use a separate bus and/or control lines for NFC operation. The internal NFC Module 656 may be used for NFC communication for other purposes, such as configuration of the flash memory array 654 and general NFC usage by processor 610. For example, in U.S. Pat. No. 8,331,857, Abdulla et al. teaches of a memory device further comprising an internal NFC module with the ability to allow configuration data to be placed into the memory array.

Figure 7:
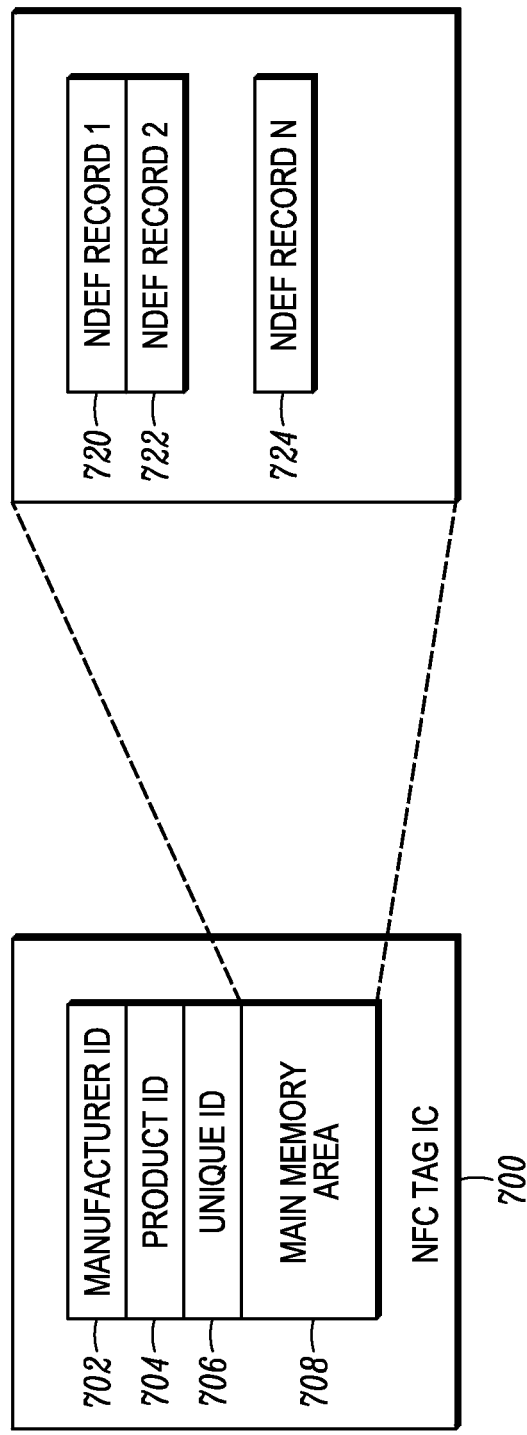
FIG. 7 is a block diagram showing the memory configuration of a system configuration tag in accordance with various embodiments of the invention.

FIG. 7 shows NFC Tag IC 700, which includes a memory array. The memory array typically includes read-only identifiers such as a manufacturer ID 702, Product ID 704, and unique identifier 706. Identifiers 702, 704 may be used to identify the type of NFC tag IC 700, and unique identifier 708 may be used for binding to a specific instance of an NFC IC 700.

Main memory area 708 may be of arbitrary size, and may be read-only, read/writable, one-time programmable, or any combination thereof. In accordance with the present invention, instructions specifying the system configuration lines state (including, but not limited to line selection, logical state, pulsing/steady, etc.) are stored in memory area 708. In the example shown, the instructions stored in memory area 708 are in the NDEF format, which is a common storage for NFC tags. The NDEF data contains a set of records such as 720, 722, and 724. The exact formatting and representation of the instructions, and their mapping to the NDEF records are not shown, but such techniques are well-known to those skilled in the art. Alternate formats other than NDEF may be used in memory area 708.

Figure 8:
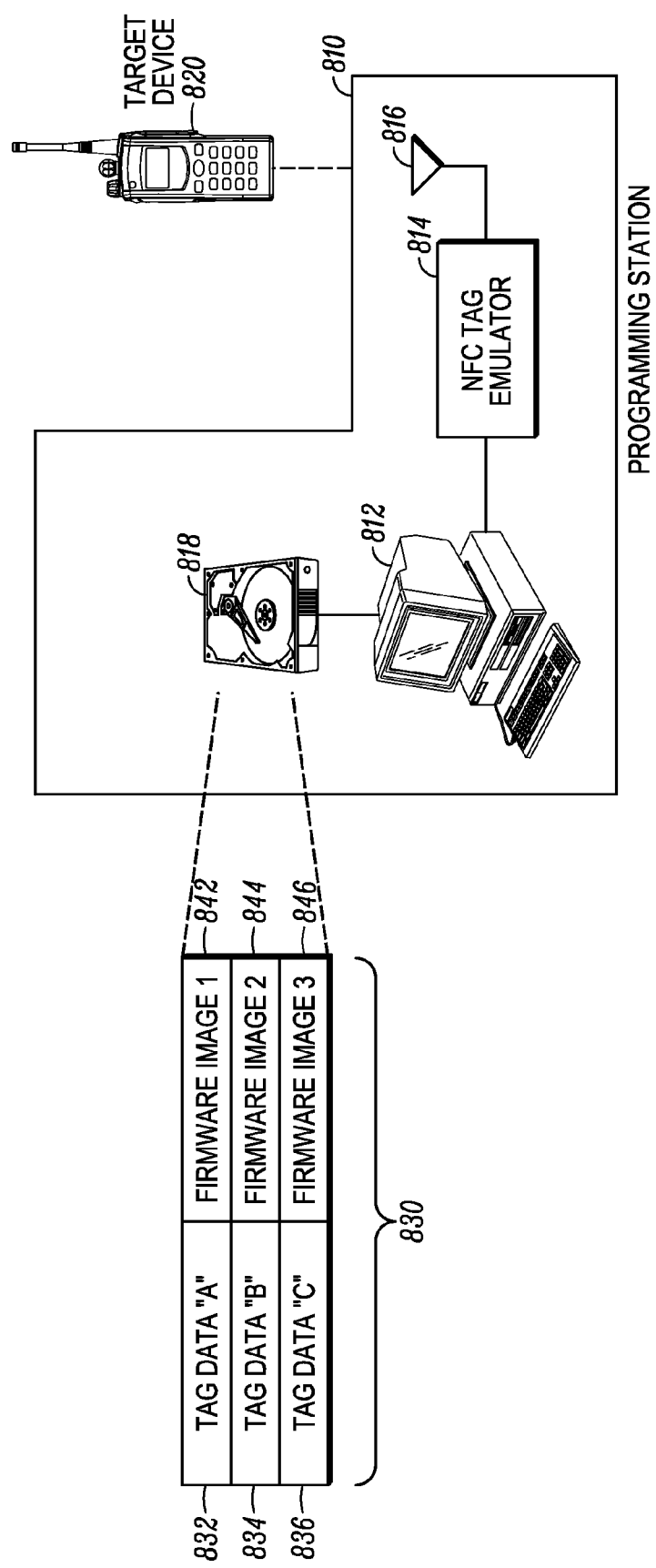
FIG. 8 is a system for programming an embedded device of one or more target devices in accordance with another embodiment.

FIG. 8 is a system 800 for programming an embedded device of one or more target devices 820 in accordance with another embodiment. In accordance with this embodiment, system 800 comprises a programming station 810 which comprises a computer 812, an NFC tag emulator 814, and an antenna 816. Computer 812 comprises local storage 818 which further comprises programming data, for example firmware or other programming data, where the programming data is associated with system configuration tag data, for example NFC tag with data. In accordance with the embodiment, the target device 820, which is initially unprogrammed, is programmable by the computer 812 using boot control selection indicated by the NFC tag emulator 814 of the programming station 810.

The configuration tag data shown in FIG. 8 may be, for example, tag data "A" 832, tag data "B" 834, and tag data "C" 836. The programming data may, for example, comprise firmware image 1, 842, firmware image 2, firmware image 3, 846. While the tag data and system configuration data are shown in table 830, the table 830 does not require a one-to-one relationship. For example, more than one set of tag data may be associated within one or more firmware images.

In accordance with this embodiment, the NFC tag emulator 814 is coupled to the computer 812, and the antenna 816 is coupled to the NFC tag emulator. The target device 820 has an embedded device with a plurality of boot modes. In accordance with this embodiment, a program operator selects (user-selectable) task to be performed, which indicates the row within table 830, which in turn selects associated programming data. For example, the section of firmware image 842 corresponds to tag data "A" 832. Again, while table 830, is shown as a one-to-one relationship, other mapping arrangements are also acceptable. In accordance with this embodiment, the computer 812 programs the NFC tag emulator 814 with the selected system configuration tag data 832, 834, or 836 associated with its respective programming data 842, 844, or 846 (e.g. firmware image), to enter boot mode. The computer 812 then programs the corresponding programming data 842, 844, 846 into the target device 820 using the associated boot mode. For example, the computer may use RS-232 or USB programming paths or means to program the corresponding programming data 842, 844, 846 into the target device 820.

In accordance with this embodiment, programming station 810 provides various service capabilities for a target device 820, including but not limited to programming, provisioning, configuration, repair, tuning, and so on. Target device 820 may require one more special modes, such as boot modes, to perform these operations. These modes may be entered solely through the use of a system configuration tag. Alternately, some or all of these modes may be accessible through other means but the use of a system configuration tag provides an easy and convenient way to access these modes.

NFC tag emulator 814 is either an active module or a passive module that is capable of being programmed, as needed, by computer 812. NFC tag emulator 814 thus appears to target device 820 as a system configuration tag, but over time the tag data presented by NFC tag emulator 814 may be changed in accordance with the exact target device detected and the desired operation to be performed. For example, target device 820 may contain two processors, each accessible by a boot mode. Firmware Image 1, 842 may be associated with the first processor and firmware image 2, 844 may be associated with the second processor. By placing the target device 820 within a short range distance from the programming station 810 allowing NFC communication with antenna 816, the computer 812 can program the programming data into the target device 820. Computer 812 first programs Tag Data A 832 into NFC emulator 814, which target device 820 sees as a system configuration tag. Target device 820 then enters a first boot mode as defined in Tag Data A 832, and then computer 812 programs firmware image 1, 842 into target device 820. Similarly, computer 812 can reprogram NFC tag emulator 814 to render tag data B 834 to target device 820, causing target device 820 to enter a second boot mode as defined in Tag Data B 834. Computer 812 can then program firmware image 2, 844 into the target device 820.

Table 830 can contain an arbitrary number of entries thus associating firmware and/or data with an associated boot mode for target device 820. Taking this embodiment further, programming station 810 can be further configured to support a plurality of different products (target device 820 and different devices) making programming station 810 highly re-usable. Those skilled in the art will appreciate the versatility of this approach in a factory or service environment.

System 800 as depicted in FIG. 8 shows operation on a complete target device 820, shown as a radio. The various embodiments, however, are not limited to a complete device and may be applied to other electronic device, sub-assemblies, modules, or printed circuit boards such as in a factory environment. Accordingly, a factory line capable of building "n" different products can benefit from the present invention.

Figure 9:
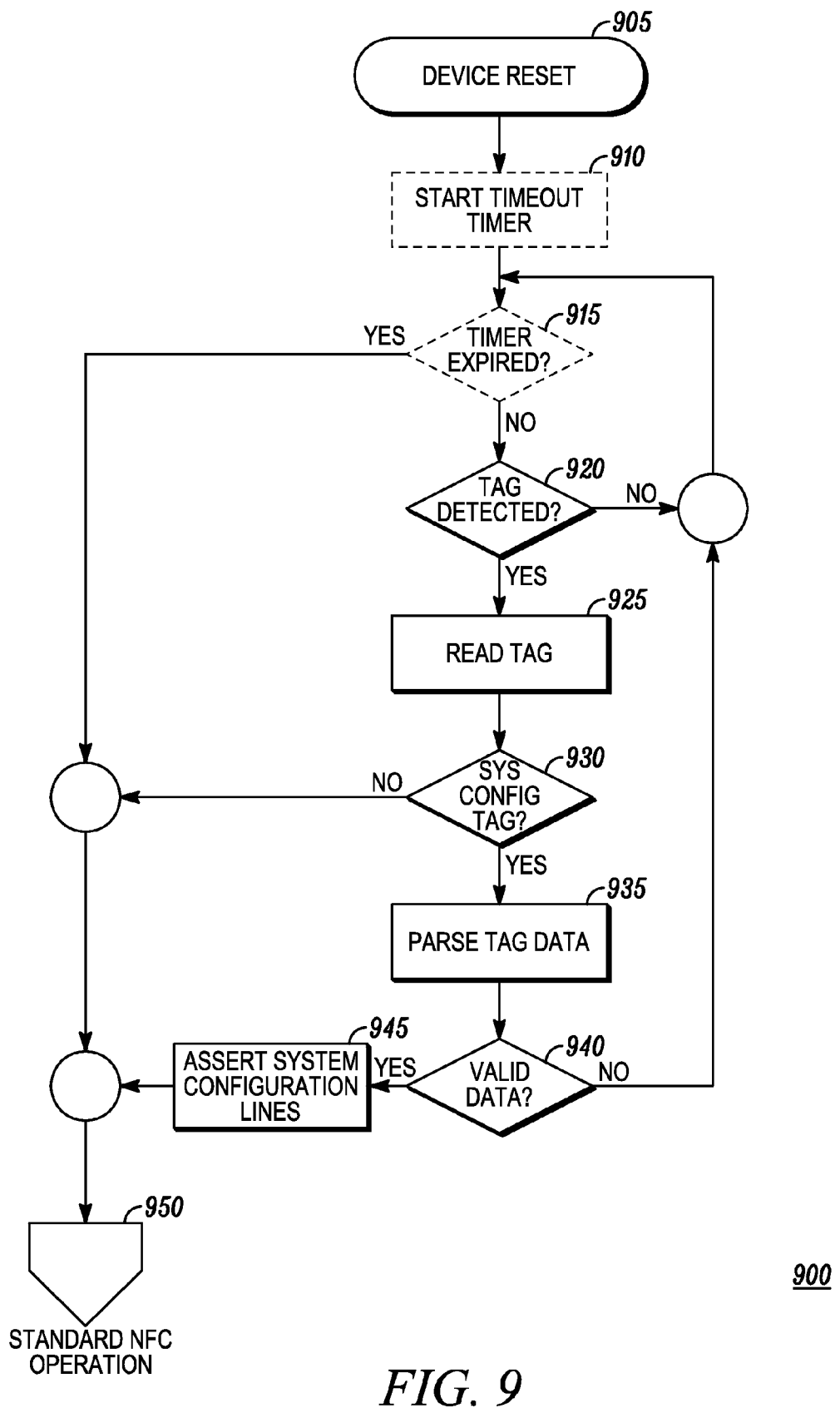
FIG. 9 shows an exemplary method 900 describing the operation of the enhanced control logic of FIGS. 2, 3, 4, and 5.

FIG. 9 shows an exemplary method 900 describing the operation of the enhanced control logic of FIGS. 2, 3, 4, 5. The device is reset at 905, which typically occurs when the device is powered on. During the initialization phase of the device, a time-out timer associated with the method may be started at 910. The time-out timer may be coupled to the processor within the embedded device to power an RF field created by the NFC module for a predetermined time at boot, thereby minimizing battery drain of the embedded device.

At 915, a check is made to see if the timeout timer has expired. If the timer has expired, execution moves to 950, which is the beginning of regular NFC operation. If the timer has not expired at 915, then the NFC module determines whether a tag has been detected at 920. If a tag was not detected, then execution continues by looping back to 915. If an NFC tag was detected at 920, then the NFC tag is read at 925. At 930, a determination is made whether the NFC tag is a system configuration tag. If the tag is not a system configuration tag, execution moves to 950, which is the beginning of regular NFC operation. If the tag is a system configuration tag, then tag data is parsed at 935 and checked for validity at 940. If the validity check at 940 determines that the system configuration tag data is not valid, then execution continues by looping back to 915. If the validity check at 940 determines that the system configuration tag is valid, then the system configuration lines are asserted at 945 in accordance with the parsed data. Execution then continues with normal NFC operation at 950.

Various variations of method 900 can be contemplated. For example, the method 900 divides NFC operation into an initial phase (steps 910 through 945) and a run-time phase (starting with step 950), where only the system configuration tag is acted upon during the initial phase. The timeout timer is used to keep the RF field powered for a short time at boot to prevent battery drain in portable devices. The time out timer provides a limited time for autonomous detection of a system configuration tag by enhanced control logic 252, 352, 452 or enhanced ROM 512 to minimize battery drain. If a device generally keeps the NFC module powered, then the timeout timer steps may be omitted. Method 900 allows either tag (a normal NFC tag or a system configuration tag) to be detected at step 950, and in the case of a system configuration tag allows the parsing of the tag data and the activation of the system control lines. This would allow a system configuration tag to be detected during runtime (as opposed to only boot-time), and to generate a reset signal (such as 234 in FIG. 2) and boot mode signature (such as 236 in FIG. 2). Thus, the method could further allow a system configuration tag to be detected during normal NFC operation. Steps 910-945 advantageously ensure system configuration tag operation at boot time, which is particularly useful in the programming of an unprogrammed device. Thus, autonomous operation of boot control through the use of NFC system configuration tags has been provided.

Accordingly, there has been provided a system and method for selecting boot mode configuration in a reliable manner. The NFC module advantageously comprises enhanced control logic to selectively control boot mode selection and regular NFC operation. The approach does not require the use of additional I/O lines thereby allowing other pin/ball/signal pads available for other purposes. In some instances, the boot control lines may be re-purposed for other uses post-reset, but in many cases this is difficult, not possible, or requires external multiplexing circuitry. Blank flashing a product can now be advantageously performed without board-level access, custom interface, custom connector, or custom cable, or custom factory fixtures. Additionally, the system and method for selecting boot mode configuration is far less susceptible to unauthorized access.

Additionally, complex systems with a plurality of processors and/or sub-system modules may now be more easily configured.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

While the embodiments described have been applied to microcontrollers, it will be appreciated that some embodiments may alternatively be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A system to select boot configuration, comprising:
a processor;
a near field communication (NFC) module coupled to the processor; and
a near field communication (NFC) tag proximately located to the NFC module, the NFC tag operating as a system configuration tag to configure boot mode of the processor; wherein the processor and near field communication (NFC) module are integrated as a single device operating as an initiator device;
a sub-module coupled to the NFC module within the initiator device;
a second system configuration tag; and
in response to the initiator device and first configuration tag being placed in proximity to each other, the processor being configured for a boot mode in response to instructions stored in the first system configuration tag; and
in response to the initiator device and the second system configuration tag being placed in proximity to each other, the sub-module being configured for a bootmode in response to instructions stored in the second system configuration tag.

2. The system of claim 1, wherein the processor is within an un-programmed product.

3. The system of claim 1, wherein the initiator device further comprises:
an additional processor coupled to the NFC module; and
an additional near field configuration tag programmed for a different boot mode of the additional processor.

4. A system for programming an embedded device, comprising:
   a computer having programming data stored therein, where the programming data is associated with at least one set of system configuration tag data;
   a NFC tag emulator coupled to the computer;
   an antenna coupled to the NFC tag emulator;
   a target device with a plurality of boot modes; and
   the computer programming the NFC tag emulator with system configuration tag data to enter a specified boot mode, and the computer programming the target device using the associated boot mode.

5. The system of claim 4, wherein the programming data is user selectable.

6. The system of claim 4, wherein the target device is initially unprogrammed and which is programmable by the computer using boot control selection indicated by the NFC emulator of the program station.

7. The system of claim 4, wherein the programming data comprises at least one of: executable code and configuration data.

8. A method for programming a target device, comprising:
   resetting the target device;
   detecting a near field communication (NFC) tag of the target device;
   reading the NFC tag;
   determining whether the NFC tag is a system configuration tag;
   parsing tag data when the NFC tag is determined to be a system configuration tag;
   checking validity of the parsed tag data; and
   in response to determining that the parsed tag data is valid, then asserting system configuration lines in accordance with the valid parsed data.

9. The method of claim 8, further comprising:
   starting a time-out timer after resetting the target device, the time-out timer providing a limited time for autonomous detection of the system configuration tag.

10. The method of claim 9, further comprising:
    beginning regular NFC operation when at least one of the following occurs:
    a time-out timer has expired;
    a system configuration tag is detected and configuration lines are asserted in response thereto; and
    a NFC tag is detected but is not a system configuration tag.

* * * * *